Sept. 26, 1967 K. S. GOODALE ET AL 3,344,412

APPARATUS FOR STORING IN OPTICAL FORM INFORMATION IN THE FORM OF A STREAM OF SERIAL ELECTRICAL DATA PULSES

Filed Sept. 6, 1966 2 Sheets-Sheet 1

Sept. 26, 1967

K. S. GOODALE ET AL 3,344,412

APPARATUS FOR STORING IN OPTICAL FORM INFORMATION IN THE FORM OF A STREAM OF SERIAL ELECTRICAL DATA PULSES

Filed Sept. 6, 1966

2 Sheets-Sheet 2

3,344,412
APPARATUS FOR STORING IN OPTICAL FORM INFORMATION IN THE FORM OF A STREAM OF SERIAL ELECTRICAL DATA PULSES

Kenneth S. Goodale, Los Altos, and Louis J. Kabell, Palo Alto, Calif., assignors to Fairchild Camera and Instrument Corporation, a corporation of Delaware Filed Sept. 6, 1966, Ser. No. 577,303
5 Claims. (Cl. 340—173)

This application is a continuation-in-part of application Ser. No. 241,436, filed Nov. 30, 1962, now abandoned, and entitled Data Storage Method.

This invention relates to apparatus for storing information and, while it is of general application, it is particularly adapted to recording of a plurality of parallel streams of serial electrical data pulses and will be specifically described in such an embodiment.

Numerous data storage methods are presently available. Probably the most common are magnetic tape and punched cards. Magnetic tape is easily erasable and reusable. Punched cards, on the other hand, are permanent and data stored thereon cannot easily be modified. This invention is in the field of permanent data storage like punched cards.

Punched cards have two serious drawbacks. First, they must be stationary at the time of each perforation and thereafter moved with respect to the punch to the next desired location. Second, the physical construction of the punch and the die design require that the perforations be relatively large and spaced well apart. If the perforations are too close together, the card loses its physical strength. If they are too small, fibres from the cards as well as dust and dirt cause errors in data interpretation. These two basic handicaps impose considerable restrictions on the speed and density of data storage with punched cards.

It is an object of the invention, therefore, to provide a new and improved apparatus for storing information which obviates one or more of the above-mentioned disadvantages of prior permanent record storage systems.

It is another object of the invention to provide a new and improved apparatus for storing information which is characterized by the ability to store information rapidly during motion of the record past a recording station and by the ability to store information with a high-density packing.

In accordance with the invention, apparatus is provided for storing in optical form on a movable record information in the form of a stream of serial electrical data pulses comprising a relatively low-optical-density substrate and a thin electrically destructible relatively high-optical-density coating, comprising means for moving the record past an information recording station, an input circuit for supplying the electrical data pulses to be stored, a circuit including switch means responsive to the electrical data pulses for deriving from the input pulses corresponding secondary current pulses of short and substantially constant duration independent of the duration of the input electrical data pulses, a conductive probe disposed to be in close proximity to a movable record, and a circuit for applying the derived secondary pulses in sequence to the probe to pass current through localized areas of the coating during motion of the record, each of the current pulses having sufficient energy to destroy an elemental area of the record coating to expose a corresponding area of the low-optical-density substrate.

For a better understanding of the present invention, together with other and further objects thereof, reference is had to the following description, taken in connection with the accompanying drawings, while its scope will be pointed out in the appended claims.

Referring now to the drawings:

FIG. 3 is a schematic circuit diagram corresponding to the simplified circuit diagram of FIG. 2, while

Figure 1:
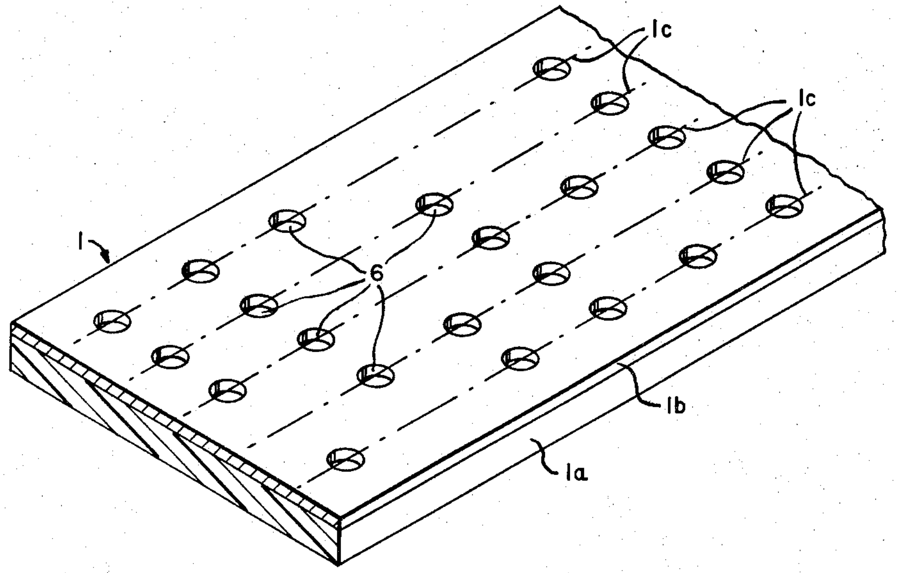
FIG. 1 is a perspective view of a segment of a record with information stored thereon in accordance with the invention.
Figure 2:
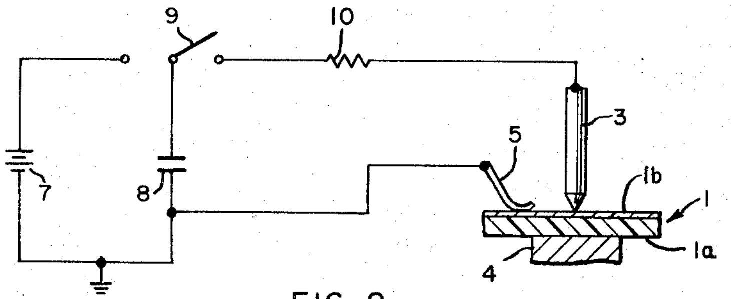
FIG. 2 is a simplified circuit diagram of an apparatus for storing information on a record in accordance with the invention.

Referring now specifically to FIGS. 1 and 2 of the drawings, there is represented an apparatus for storing sequential information in optical form on a movable record 1 comprising a relatively low-optical-density substrate ,such as a substantially transparent plastic tape 1*a*, having a thin electrically destructible coating 1*b* of high optical density relative to that of the substrate 1*a* which may, for example, be an aluminum film of a thickness from about 400 A. upward. Although thinner films may be used, their uniformity and reliability are questionable. A coating too thick is not desirable inasmuch as it is more difficult to electrically destroy and may impair the flexibility of the substrate.

The apparatus further comprises means for moving the record 1 past an information recording station. For example, as shown in FIG. 2, the coated tape 1 passes between a conductive probe 3 spaced from, but in close proximity to, the tape 1 at the recording station. The base 4 may be any conventional tape support structure while the probe 3 is preferably in the form of a fine tungsten wire. Customarily, the tape 1 will be moved continuously past the recording station by conventional means such as rollers or sprockets (not shown).

The apparatus of the invention further comprises an input circuit for supplying an electric pulse representative of each element of information to be stored. In the simplified circuit of FIG. 2, this is represented by a switch 9 effective to close a circuit from a power source such as a battery 7 to charge a capacitor 8, each closure of the switch 9 producing a pulse of voltage across capacitor 8. There is also provided a circuit for deriving from the input pulses secondary pulses of short and constant duration and for applying such secondary pulses in sequence to the probe 3. This circuit comprises the switch 9 operated to its right-hand contact, completing a circuit through resistor 10, the probe 3, the conductive coating 1*b*, and a broad area contact or brush 5 making contact with the conductive coating 1*b* outside of the area on which the data is to be recorded. Upon the closing of switch 9 to its right-hand contact, a surge of current from the capacitor 8 passes through the last-described circuit and causes current to pass through a highly localized area of the coating 1*b* immediately beneath the probe 3 during motion of the record. With this arrangement, each of the secondary current pulses represented by the discharge of capacitor 8 is of short duration and substantially constant amplitude.

The parameters of the circuit of FIG. 2 are selected such that each of the secondary current pulses has sufficient energy to destroy an elemental area of the coating 1*b* to expose a corresponding area of the low-optical-density or transparent substrate 1*a*. The size of the exposed area may be varied by changing the amplitude or duration of the current pulse, such as by changing the size of capacitor 8 or the magnitude of the voltage of the power source 7. If the probe 3 is in contact with the coating 1*b*, the arrangement is such that the heat from the concentrated current at the point of the probe 3 is sufficient to destroy or vaporize a tiny area of the coating *1b*. If the probe 3 is spaced from, but in close proximity to, the coating *1b*, there is formed a dense electric discharge which produces a similar effect.

The result of application of a series of current pulses to a group of probes is represented in FIG. 1 comprising five information channels *1c*, it being understood that with such an arrangement there will be provided an array of five probes such as the probe 3. Each current pulse applied to the probe 3 results in destroying or vaporizing the elemental area of the coating *1b*, producing a series of windows 6; that is, minute areas of the transparent substrate *1a* are exposed through the openings 6.

Figure 3:
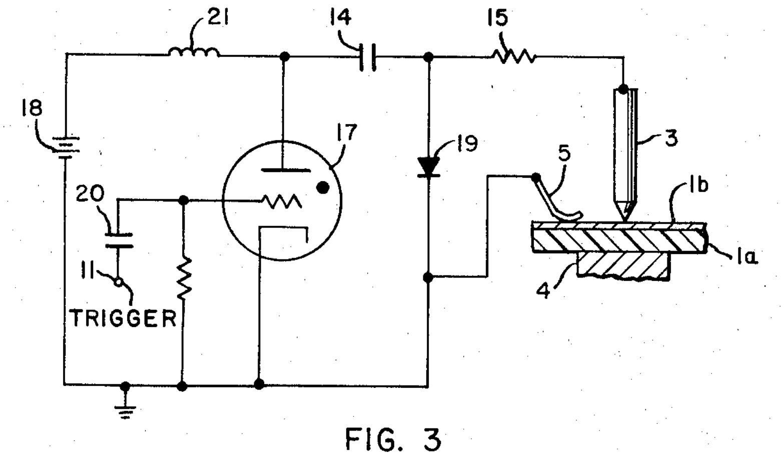

While a variety of practical circuits may be utilized to develop and apply the current pulses to probes such the probe 3, there is shown in FIG. 3 a schematic diagram of one circuit suitable for this purpose. In this circuit, the input electrical pulses, which may be termed trigger pulses, are applied to an input terminal 11 and thence through a coupling capacitor 20 to the control grid of a thyratron tube 17. A capacitor 14 is charged from a source such as a battery 18 through an inductor 21 and a unilaterally conductive device such as a diode rectifier 19 of either the semiconductor or electron-discharge type. When a trigger pulse is applied to input terminal 11, the thyratron 17 becomes conductive and the capacitor 14 discharges through a current-limiting resistor 15, the probe 3, conductive coating *1b*, and contact 5, developing a secondary current pulse or a discharge into the coating *1b* immediately beneath the point of the probe 3. When capacitor 14 becomes substantially discharged, the thyratron 17 automatically becomes nonconductive, the inductor 21 preventing the build-up of current from source 18 during the discharge time of capacitor 14. Again, it is seen that these secondary pulses are of short duration and substantially constant amplitude.

Figure 4:
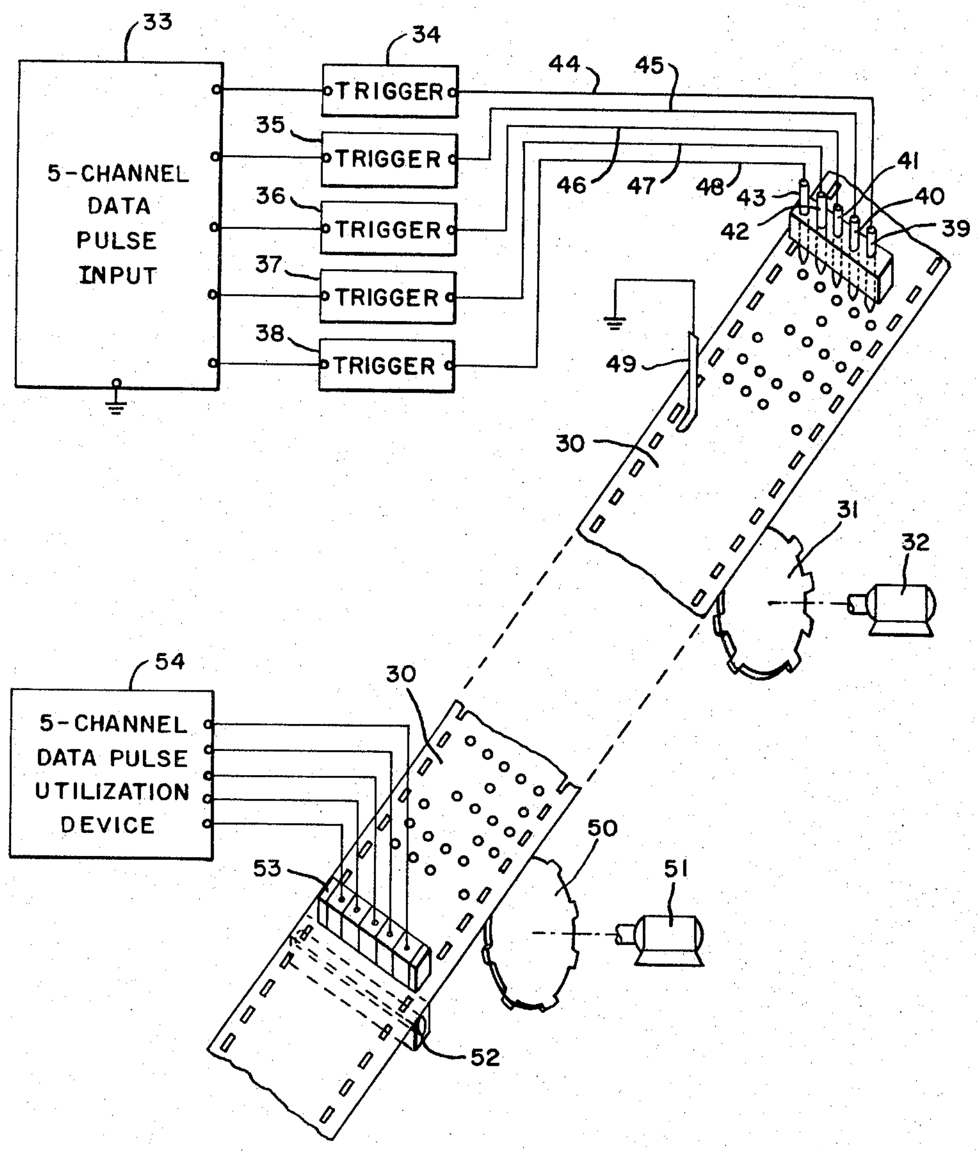
FIG. 4 is a schematic diagram of an apparatus for recording a plurality of parallel streams of serial electrical data pulses upon a moving record and for retrieving the information recorded thereon.

Referring now to FIG. 4 of the drawings, there is represented a system for storing sequential elemental information in optical form in a plurality of channels on a movable record 30 of the type described and for retrieving the recorded information. This system includes means for moving a record tape 30 past an information recording station. The tape driving means may be conventional in form and is shown as a sprocket 31 driven by a motor 32 and engaging conventional sprocket holes in the tape 30. The system further comprises an input circuit for supplying a plurality of parallel streams of serial electrical data pulses representative of each element of information to be stored. This input circuit is represented as a conventional data-pulse-input unit 33 having five output channels.

The system of FIG. 4 further comprises a plurality of circuits for deriving from the input pulses delivered by the unit 33, secondary current pulses of short duration, specifically a plurality of trigger circuits 34, 35, 36, 37, and 38 each of which may be of any conventional form, for example such as that shown in FIG. 3 and described above. The system further comprises an array of conductive probes 39, 40, 41, 42, and 43 disposed to be in close proximity to the record tape 30 at the recording station. The secondary current pulses from the trigger circuits 34–38, inclusive, are applied via circuits 44–48, respectively, to the probes 39–43, respectively, thereby causing the current pulses to pass through localized areas of the conductive coating of the record tape 30 during its motion past the recording station. The circuits for the probes 39–43, inclusive, are completed by a broad area contact or brush 49. As in the arrangement of FIGS. 1 to 3 described, each of the current pulses supplied to the probes 39–43, inclusive, has sufficient energy to destroy or vaporize an elemental area of the coating on the record tape 30 to expose a corresponding area of the transparent substrate.

The system of FIG. 4 further comprises means for moving a recorded record 30 past an information retrieval station, this means being a conventional sprocket 50 engaging the sprocket holes of the record tape 30 and driven by a motor 51. The system further comprises means for illuminating the record tape 30 at the retrieval station, this being in the form of a linear light source 52 disposed beneath and in proximity to the tape 30. Above the tape 30 and in registry with the light source 52 is an array 53 of photoelectric devices, for example semiconductor photodiodes, disposed to detect the light passing through exposed substrate areas for developing a plurality of parallel streams of serial data pulses representative of the recorded information. The photodiodes of the array 53 are individually connected to five input terminals of a five-channel data pulse utilization device 54 which may be conventional and forms no part of the present invention.

It is believed that the operation of the system of FIG. 4 will be apparent from the foregoing description. In brief, the five parallel streams of serial electrical data pulses supplied by the input unit 33 are effective to excite the trigger circuits 34–38, inclusive, which, in turn, energize the probes 39–43, respectively, in accordance with the input coded data pulses. The resulting current pulses passing through the probes 39–43, inclusive, cause destruction or vaporization of selected minute elemental areas of the coating *1b* immediately underneath the probes producing the pattern shown, corresponding to that of FIG. 1.

As shown, the record tape 30 is broken away to indicate a separation in time or space, or both, between the recording process described and the subsequent retrieval process. At the retrieval station, the several windows or openings in the coating *1b* permit light from the source 52 to pass upwardly and impinge upon the appropriate ones of the photodiodes of the array 53 which develop corresponding electrical pulses which are supplied to the utilization device 54.

The record 30 of FIG. 4 is preferably in the form of a coated flexible plastic tape such as a polyester film, commercially available from E. I. du Pont de Nemours & Co. under the name "Mylar" or equivalent, which is substantially transparent. The coating *1b* may be any electrically destructible or vaporizable material which can be easily applied to the substrate. For example, the coating *1b* may be copper, aluminum, zinc, or iron although aluminum is preferred since it may be readily applied by deposition processes well known in the art and is easily vaporizable. The coating *1b* may be applied to the substrate *1a* by any conventional method such as spraying, plating, vapor deposition, etc. The coating should be uniformly distributed on the tape and should be sufficiently thick to provide a low-resistance return path to the contact brush 49 but thin enough so that elemental areas can be readily vaporized. An aluminum coating having a thickness in the range 800 to 1200 A. is preferred. The probe, such as the probes 39–43, inclusive, should be extremely fine tungsten wire in order to provide complete vaporization in minute localized areas directly beneath them.

The information storing apparatus of the invention has a number of distinct advantages over prior systems for accomplishing a similar purpose. The record tape itself is not perforated but only minute portions of a thin conductive coating are removed, as by vaporization, so that the strength of the record tape is not impaired. This is in contrast to tape or card perforating systems in which, if the data storage density becomes too great, the physical strength of the tape or card is seriously impaired. In contrast, the present invention makes possible the recording of data with a high packing density without any impairment of the physical strength of the record.

Further, the recording system of the invention provides a high degree of resolution. The windows or exposed areas of the substrate of the record tape are sharply outlined, being formed by current pulses of high density and small cross-sectional area from the fine tungsten wire probes. The resulting windows or openings in the coating 1*b* may be microscopic in size and still sufficiently large for accurate optical readings as by the photodiode array 53. Moreover, in the information recording system of the invention, the duration of the current pulses is so short, for example of the order of 0.1 microsecond, that the information may be recorded on the record even while the record is moving past the recording station at a relatively high speed. In this respect, it achieves the advantages of magnetic tape information-recording apparatus without the lack of permanence and other shortcomings of such apparatus.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. Apparatus for storing in optical form on a movable record information in the form of a stream of serial electrical data pulses comprising a relatively low-optical-density substrate and a thin electrically destructible relatively high-optical-density coating, comprising:

means for moving the record past an information recording station;

an input circuit for supplying the electrical data pulses to be stored;

a circuit including switch means responsive to said data pulses for deriving therefrom corresponding secondary current pulses of short and substantially constant duration independent of the duration of said data pulses;

a conductive probe disposed to be in close proximity to a movable record;

and a circuit for applying said secondary pulses in sequence to said probe to pass current through localized areas of said coating during motion of the record;

each of said current pulses having sufficient energy to destroy an elemental area of said coating to expose a corresponding area of low-optical-density substrate.

2. An apparatus for storing information in accordance with claim 1 in which the record is a substantially transparent plastic tape and the coating an aluminum film of at least 400 A. in thickness.

3. An apparatus for storing information in accordance with claim 1 which includes a plurality of conductive probes and associated circuits for recording information on the record in a plurality of channels simultaneously.

4. A system for storing in optical form on a movable record information in the form of a plurality of parallel streams of serial electrical data pulses comprising a relatively low-optical-density substrate and a thin electrically destructible relatively high-optical-density coating, and retrieving the same, comprising:

means for moving the record past an information recording station;

an input circuit for supplying the electrical data pulses to be stored;

a circuit including switch means responsive to said data pulses for deriving therefrom corresponding secondary current pulses of short and substantially constant duration independent of the duration of said data pulses;

a conductive probe disposed to be in close proximity to a movable record;

a circuit for applying said secondary pulses in sequence to said probe to pass current through localized areas of said coating during motion of the record;

each of said current pulses having sufficient energy to destroy an elemental area of said coating to expose a corresponding area of low-optical-density substrate;

means for moving the recorded record past an information retrieval station;

means for illuminating the record at said retrieval station;

and means for detecting the light passing through the exposed substrate areas to obtain the stored information.

5. A system for storing in optical form on a movable record information in the form of a plurality of parallel streams of serial electrical data pulses comprising a relatively low-optical-density substrate and a thin electrically destructible relatively high-optical-density coating, and for retrieving the same, comprising:

means for moving the record past an information recording station;

an input circuit for supplying a plurality of parallel streams of serial electrical data pulses representative of each element of information to be stored;

a plurality of circuits, each including switch means responsive to one of said streams of data pulses for deriving therefrom corresponding secondary current pulses of short and substantially constant duration independent of the duration of said data pulses;

an array of conductive probes disposed to be in close proximity to a movable record;

a plurality of circuits for individually applying said secondary pulses of each data stream in sequence to said probes to pass current through localized areas of said coating during motion of the record;

each of said current pulses having sufficient energy to destroy an elemental area of said coating to expose a corresponding area of low-optical-density substrate;

means for moving the recorded record past an information retrieval station;

means for illuminating the record at said retrieval station;

and an array of photodiodes disposed to detect the light passing through each group of exposed substrate areas for developing a plurality of parallel streams of serial data pulses representative of the recorded information.

References Cited

UNITED STATES PATENTS

| | | | |
|---|---|---|---|
| 2,836,479 | 5/1958 | Traub et al. | 346—74 |
| 2,858,181 | 10/1958 | Ortlieb | 346—74 |
| 3,074,066 | 1/1963 | Conerly | 346—74 |

FOREIGN PATENTS

| | | |
|---|---|---|
| 798,092 | 7/1958 | Great Britain. |

TERRELL W. FEARS, *Primary Examiner.*

BERNARD KONICK, *Examiner.*

J. BREIMAYER, *Assistant Examiner.*